United States Patent
Yang et al.

(10) Patent No.: US 10,670,123 B2
(45) Date of Patent: Jun. 2, 2020

(54) POWER TRANSMISSION SYSTEM FOR VEHICLE AND VEHICLE COMPRISING THE SAME

(71) Applicant: BYD COMPANY LIMITED, Shenzhen, Guangdong (CN)

(72) Inventors: Dongsheng Yang, Guangdong (CN); Yubo Lian, Guangdong (CN); Jintao Zhang, Guangdong (CN); Hongbin Luo, Guangdong (CN)

(73) Assignee: BYD COMPANY LIMITED, Shenzhen (CN)

(*) Notice: Subject to any disclaimer, the term of this patent is extended or adjusted under 35 U.S.C. 154(b) by 732 days.

(21) Appl. No.: 14/527,572

(22) Filed: Oct. 29, 2014

(65) Prior Publication Data
US 2015/0211617 A1 Jul. 30, 2015

(30) Foreign Application Priority Data

Jan. 30, 2014 (CN) .......................... 2014 1 0044230
Jan. 30, 2014 (CN) ...................... 2014 2 0057704 U

(51) Int. Cl.
*B60K 6/38* (2007.10)
*F16H 37/08* (2006.01)
(Continued)

(52) U.S. Cl.
CPC ......... *F16H 37/0806* (2013.01); *B60K 6/387* (2013.01); *B60K 6/442* (2013.01); *B60K 6/52* (2013.01); *B60K 7/0007* (2013.01); *B60K 17/356* (2013.01); *Y02T 10/6234* (2013.01); *Y02T 10/6265* (2013.01); *Y10S 903/917* (2013.01); *Y10T 74/19014* (2015.01)

(58) Field of Classification Search
CPC ..... F16H 37/0806; F16H 3/006; B60K 6/387; B60K 6/442; B60K 6/52
USPC .................................................. 74/330, 661
See application file for complete search history.

(56) References Cited

U.S. PATENT DOCUMENTS 4,132,133 A   1/1979   Ballendux
4,610,177 A   9/1986   Mahoney
(Continued)

FOREIGN PATENT DOCUMENTS

CN   2602978 Y   2/2004
CN   1618644 A   5/2005
(Continued)

OTHER PUBLICATIONS

Extended European Search Report dated Jun. 29, 2016, issued in related European Patent Application No. 15158699.7 (8 pages).
(Continued)

*Primary Examiner* — William C Joyce

(57) ABSTRACT

A power transmission system for a vehicle and a vehicle including the same are provided. The power transmission system includes an engine unit configured to generate power, a transmission unit adapted to selectively be coupled with the engine unit, and configured to transmit the power generated by the engine unit, a first motor generator coupled with the transmission unit, an output unit configured to transmit the power output by the transmission unit to at least one of front and rear wheels of the vehicle, and a second motor generator configured to drive the at least one of the front and rear wheels.

15 Claims, 8 Drawing Sheets

(51) Int. Cl.
*B60K 17/356* (2006.01)
*B60K 6/442* (2007.10)
*B60K 7/00* (2006.01)
*B60K 6/52* (2007.10)
*B60K 6/387* (2007.10)

(56) References Cited

U.S. PATENT DOCUMENTS

| | | | |
|---|---|---|---|
| 4,676,115 | A | 6/1987 | Morscheck et al. |
| 5,081,365 | A | 1/1992 | Field et al. |
| 5,586,613 | A | 12/1996 | Ehsani |
| 5,890,392 | A | 4/1999 | Ludanek et al. |
| 6,120,115 | A | 9/2000 | Kouta et al. |
| 6,364,434 | B1 | 2/2002 | Min et al. |
| 6,634,247 | B2 | 10/2003 | Pels |
| 7,296,648 | B2 | 11/2007 | Tatara et al. |
| 7,383,749 | B2 | 6/2008 | Schafer et al. |
| 7,395,889 | B2 | 7/2008 | Sugiyama et al. |
| 7,428,852 | B2 | 9/2008 | Baldwin et al. |
| 7,437,966 | B2 | 10/2008 | Maillard et al. |
| 7,730,982 | B2 | 6/2010 | Hidaka et al. |
| 7,987,739 | B2 | 8/2011 | Okadome et al. |
| 8,297,141 | B2 | 10/2012 | Cimatti |
| 8,505,400 | B2 | 8/2013 | Mellet et al. |
| 8,523,734 | B2 | 9/2013 | Mepham et al. |
| 8,579,059 | B2 | 11/2013 | Teraya |
| 8,590,411 | B2 * | 11/2013 | Lee .......... F16H 3/006 74/330 |
| 8,608,615 | B2 | 12/2013 | Fuechtner et al. |
| 8,887,588 | B2 | 11/2014 | Koyama et al. |
| 8,931,371 | B2 | 1/2015 | Xie et al. |
| 9,145,951 | B2 | 3/2015 | Ho et al. |
| 9,003,907 | B2 | 4/2015 | Weller et al. |
| 9,341,239 | B2 | 5/2016 | Lee et al. |
| 9,568,066 | B2 | 2/2017 | Yang et al. |
| 2002/0088291 | A1 * | 7/2002 | Bowen .......... B60K 6/52 74/339 |
| 2002/0177504 | A1 | 11/2002 | Pels et al. |
| 2003/0078134 | A1 | 4/2003 | Kojima et al. |
| 2003/0184147 | A1 | 10/2003 | Perach Asi et al. |
| 2004/0149080 | A1 * | 8/2004 | Pollak .......... B60K 17/34 74/661 |
| 2004/0204286 | A1 | 10/2004 | Stridsberg |
| 2005/0241437 | A1 | 11/2005 | Gray, Jr. et al. |
| 2005/0139035 | A1 | 12/2005 | Mcmurry et al. |
| 2006/0048516 | A1 | 3/2006 | Tenbrock et al. |
| 2006/0169076 | A1 * | 8/2006 | Gumpoltsberger .... F16H 3/006 74/330 |
| 2006/0175103 | A1 | 8/2006 | Iida et al. |
| 2007/0028718 | A1 | 2/2007 | Lee et al. |
| 2007/0102211 | A1 | 5/2007 | Nozaki et al. |
| 2007/0175723 | A1 | 8/2007 | Blessing et al. |
| 2007/0265126 | A1 * | 11/2007 | Janson .......... B60K 6/387 475/5 |
| 2007/0266810 | A1 | 11/2007 | Forsyth |
| 2007/0272457 | A1 | 11/2007 | Kodama et al. |
| 2008/0070745 | A1 | 3/2008 | Ogata |
| 2008/0099267 | A1 * | 5/2008 | Ruehle .......... B60K 17/344 180/233 |
| 2008/0099305 | A1 | 5/2008 | Ogasawara |
| 2008/0134819 | A1 | 6/2008 | Kapp et al. |
| 2008/0202267 | A1 | 8/2008 | Hendrickson et al. |
| 2008/0234914 | A1 | 9/2008 | Tabata et al. |
| 2009/0145673 | A1 | 6/2009 | Soliman et al. |
| 2010/0031910 | A1 | 2/2010 | Seufert et al. |
| 2010/0076657 | A1 | 3/2010 | Jinno et al. |
| 2010/0101366 | A1 * | 4/2010 | Braford .......... B60K 17/35 74/665 G |
| 2010/0120580 | A1 | 5/2010 | Mepham et al. |
| 2010/0197436 | A1 * | 8/2010 | Ideshio .......... B60K 6/365 475/8 |
| 2010/0320016 | A1 | 12/2010 | Wang et al. |
| 2011/0098151 | A1 | 4/2011 | Ziemer |
| 2011/0113923 | A1 | 5/2011 | Pesola et al. |
| 2011/0245033 | A1 | 10/2011 | Sato et al. |
| 2011/0263379 | A1 | 10/2011 | Liang et al. |
| 2011/0265601 | A1 | 11/2011 | Pastorello et al. |
| 2012/0010041 | A1 | 1/2012 | Soliman et al. |
| 2012/0053011 | A1 | 3/2012 | Onomura et al. |
| 2012/0160044 | A1 | 6/2012 | Kahl |
| 2012/0245781 | A1 | 9/2012 | Kanamori et al. |
| 2012/0245783 | A1 | 9/2012 | Tamagawa |
| 2012/0303201 | A1 | 11/2012 | Tsuneishi et al. |
| 2012/0304789 | A1 * | 12/2012 | Misu .......... B60K 6/547 74/331 |
| 2012/0310461 | A1 | 12/2012 | Maruyama et al. |
| 2012/0325048 | A1 | 12/2012 | Raisch |
| 2012/0325573 | A1 | 12/2012 | Miller |
| 2013/0068056 | A1 | 3/2013 | Van Batavia et al. |
| 2013/0090202 | A1 | 4/2013 | Hiraiwa |
| 2013/0096749 | A1 | 4/2013 | Hussain et al. |
| 2013/0096784 | A1 | 4/2013 | Kohler et al. |
| 2013/0105253 | A1 | 5/2013 | Kim et al. |
| 2013/0166118 | A1 | 6/2013 | Kim |
| 2013/0192417 | A1 | 8/2013 | Fujita et al. |
| 2013/0231848 | A1 | 9/2013 | Roberts et al. |
| 2013/0288854 | A1 | 10/2013 | Kobayashi |
| 2013/0345019 | A1 | 12/2013 | Kaltenbach et al. |
| 2014/0128205 | A1 | 5/2014 | Phillips et al. |
| 2015/0167786 | A1 | 6/2015 | Kim |
| 2015/0167803 | A1 | 6/2015 | Lee et al. |
| 2015/0291154 | A1 | 10/2015 | Kaltenbach et al. |
| 2015/0336568 | A1 | 11/2015 | Porras et al. |
| 2016/0084351 | A1 | 3/2016 | Lee et al. |
| 2016/0298733 | A1 | 10/2016 | Helmut et al. |

FOREIGN PATENT DOCUMENTS

| | | |
|---|---|---|
| CN | 1637327 A | 7/2005 |
| CN | 1699091 A | 11/2005 |
| CN | 1728192 A | 2/2006 |
| CN | 1275790 C | 9/2006 |
| CN | 1876460 A | 12/2006 |
| CN | 101209675 A | 7/2008 |
| CN | 101219662 A | 7/2008 |
| CN | 101380887 A | 3/2009 |
| CN | 101400536 A | 4/2009 |
| CN | 201214410 Y | 4/2009 |
| CN | 101450609 B | 6/2009 |
| CN | 101516708 A | 8/2009 |
| CN | 101549634 A | 10/2009 |
| CN | 201390137 Y | 1/2010 |
| CN | 101659203 A | 3/2010 |
| CN | 201511806 U | 6/2010 |
| CN | 101973207 A | 2/2011 |
| CN | 101983150 A | 3/2011 |
| CN | 102009587 A | 4/2011 |
| CN | 201907400 U | 7/2011 |
| CN | 102166962 | 8/2011 |
| CN | 102259583 A | 11/2011 |
| CN | 102259584 A | 11/2011 |
| CN | 102303517 A | 1/2012 |
| CN | 102343824 | 2/2012 |
| CN | 102371893 A | 3/2012 |
| CN | 102381178 | 3/2012 |
| CN | 102381178 A | 3/2012 |
| CN | 202242966 U | 5/2012 |
| CN | 102490588 A | 6/2012 |
| CN | 202319954 U | 7/2012 |
| CN | 202345366 U | 7/2012 |
| CN | 101450608 B | 9/2012 |
| CN | 102666169 A | 9/2012 |
| CN | 102673365 A | 9/2012 |
| CN | 102673382 A | 9/2012 |
| CN | 102678839 A | 9/2012 |
| CN | 102678871 A | 9/2012 |
| CN | 202429065 U | 9/2012 |
| CN | 102717714 | 10/2012 |
| CN | 102781698 A | 11/2012 |
| CN | 202641355 U | 1/2013 |
| CN | 202641405 | 1/2013 |
| CN | 202656855 U | 1/2013 |
| CN | 102910066 A | 2/2013 |

(56) References Cited

FOREIGN PATENT DOCUMENTS

| | | |
|---|---|---|
| CN | 102951005 A | 3/2013 |
| CN | 102975607 A | 3/2013 |
| CN | 103029558 A | 4/2013 |
| CN | 103144528 A | 6/2013 |
| CN | 103332102 A | 10/2013 |
| CN | 203283020 U | 11/2013 |
| CN | 203305832 U | 11/2013 |
| CN | 103527726 A | 1/2014 |
| CN | 103697118 A | 4/2014 |
| CN | 203516615 U | 4/2014 |
| CN | 103832263 A | 6/2014 |
| CN | 103867657 A | 6/2014 |
| CN | 103912640 A | 7/2014 |
| CN | 103921674 A | 7/2014 |
| CN | 203876574 U | 10/2014 |
| CN | 203962884 U | 11/2014 |
| CN | 102555769 B | 12/2014 |
| CN | 204095490 U | 1/2015 |
| DE | 10239540 A1 | 3/2004 |
| DE | 102008002381 A1 | 12/2009 |
| DE | 102011115780 A1 | 4/2012 |
| DE | 102011086743 A1 | 5/2013 |
| DE | 102011089467 A1 | 6/2013 |
| DE | 102012222122 A1 | 6/2014 |
| DE | 102013201744 A1 | 8/2014 |
| EP | 1122109 A2 | 8/2001 |
| EP | 1375241 | 2/2004 |
| EP | 1555184 | 7/2005 |
| EP | 1979185 | 10/2008 |
| EP | 1 990 229 * | 11/2008 |
| EP | 1990229 A2 | 12/2008 |
| EP | 2080682 | 7/2009 |
| EP | 2133252 | 12/2009 |
| EP | 2210758 A1 | 7/2010 |
| EP | 2255986 A1 | 12/2010 |
| EP | 2279922 A1 | 2/2011 |
| EP | 2385270 A1 | 11/2011 |
| EP | 2390127 A1 | 11/2011 |
| EP | 2439094 A1 | 4/2012 |
| EP | 2460704 | 6/2012 |
| EP | 2474434 A1 | 7/2012 |
| EP | 2508378 A1 | 10/2012 |
| EP | 2517938 A1 | 10/2012 |
| EP | 2631103 | 8/2013 |
| EP | 2636554 | 9/2013 |
| EP | 2636566 | 9/2013 |
| EP | 2636567 | 9/2013 |
| EP | 2641802 A2 | 9/2013 |
| EP | 2738030 A2 | 6/2014 |
| EP | 2995477 | 3/2016 |
| EP | 2995487 | 3/2016 |
| JP | H0993714 A | 4/1997 |
| JP | 2001157305 | 6/2001 |
| JP | 2001191814 | 7/2001 |
| JP | 2005133682 | 5/2005 |
| JP | 2010-70188 * | 4/2010 |
| JP | 2010-76761 * | 4/2010 |
| JP | 2010076761 A | 4/2010 |
| JP | 20100701088 A | 4/2010 |
| JP | 2010179789 | 8/2010 |
| JP | 2010-213418 * | 9/2010 |
| JP | 2010281237 | 12/2010 |
| JP | 2012-76539 * | 4/2012 |
| JP | 2012086701 | 5/2012 |
| JP | 2013-126365 A | 6/2013 |
| JP | 2013199909 | 10/2013 |
| JP | 2013-240166 A | 11/2013 |
| KR | 101339264 | 12/2013 |
| WO | WO 99/21263 A2 | 4/1999 |
| WO | WO 2008/092353 A1 | 8/2008 |
| WO | WO 2010/054210 A1 | 5/2010 |
| WO | 2011138308 A1 | 11/2011 |
| WO | 2012152613 | 11/2012 |
| WO | WO 2013/014510 A1 | 1/2013 |
| WO | WO 2013/031491 A1 | 3/2013 |
| WO | 2015032346 | 3/2015 |

OTHER PUBLICATIONS

Final Office Action dated Jun. 17, 2016, issued in related U.S. Appl. No. 14/527,600 (19 pages).
Final Office Action dated Jun. 28, 2016, issued in related U.S. Appl. No. 14/527,410 (21 pages).
Notice of Allowance dated Oct. 19, 2016, issued in related U.S. Appl. No. 14/527,446 (7 pages).
Final Office Action dated Oct. 20, 2016, issued in related U.S. Appl. No. 14/527,496 (8 pages).
Notice of Allowance dated Oct. 26, 2016, issued in related U.S. Appl. No. 14/527,600 (19 pages).
Notice of Allowance dated Nov. 1, 2016, issued in related U.S. Appl. No. 14/644,943 (8 pages).
Notice of Allowance dated Nov. 4, 2016, issued in related U.S. Appl. No. 14/527,496 (8 pages).
Notice of Allowance dated Nov. 4, 2016, issued in related U.S. Appl. No. 14/644,818 (7 pages).
European Search Report and Written Opinion for Application No. 14880411.5, dated Apr. 11, 2017, 12 pages.
European Search Report and Written Opinion for Application No. 14881104.5, dated May 5, 2017, 8 pages.
Non-Final Office Action for U.S. Appl. No. 14/527,410, dated Jan. 13, 2017, 23 pages.
Non-Final Office Action for U.S. Appl. No. 14/755,540, dated Jan. 26, 2017, 15 pages.
Non-Final Office Action for U.S. Appl. No. 14/755,695, dated May 4, 2017, 6 pages.
Non-Final Office Action for U.S. Appl. No. 14/755,775, dated May 10, 2017, 9 pages.
Non-Final Office Action for U.S. Appl. No. 14/755,629, dated May 17, 2017, 6 pages.
Non-Final Office Action for U.S. Appl. No. 14/644,881, dated May 19, 2017, 29 pages.
Final Office Action for U.S. Appl. No. 14/755,540, dated May 24, 2017, 11 pages.
Final Office Action for U.S. Appl. No. 14/527,410, dated Jun. 6, 2017, 26 pages.
Chinese Search Report dated May 26, 2015, issued in related Chinese Application No. 201510024072.4 (7 pages).
Chinese Search Report dated May 26, 2015, issued in related Chinese Application No. 201510024073.9 (7 pages).
Chinese Search Report dated May 26, 2015, issued in related Chinese Application No. 201510024171.2 (7 pages).
Chinese Search Report dated May 26, 2015, issued in related Chinese Application No. 201510024172.7 (7 pages).
Chinese Search Report dated May 26, 2015, issued in related Chinese Application No. 201510024198.1 (7 pages).
Chinese Search Report dated May 27, 2015, issued in related Chinese Application No. 201510024215.1 (8 pages).
Chinese Search Report dated May 27, 2015, issued in related Chinese Application No. 201510024314.X (8 pages).
PCT International Search Report dated Jan. 16, 2015, issued in related International Application No. PCT/CN2014/089831 (15 pages).
PCT International Search Report dated Jan. 19, 2015, issued in related International Application No. PCT/CN2014/089840 (15 pages).
PCT International Search Report dated Jan. 21, 2015, issued in related International Application No. PCT/CN2014/089837 (14 pages).
PCT International Search Report dated Jan. 21, 2015, issued in related International Application No. PCT/CN2014/089846 (14 pages).
PCT International Search Report dated Jan. 21, 2015, issued in related International Application No. PCT/CN2014/089847 (13 pages).

(56) References Cited

OTHER PUBLICATIONS

PCT International Search Report dated Jan. 26, 2015, issued in related International Application No. PCT/CN2014/089841 (14 pages).
PCT International Search Report dated Jan. 28, 2015, issued in related International Application No. PCT/CN2014/089829 (14 pages).
PCT International Search Report dated Jan. 28, 2015, issued in related International Application No. PCT/CN2014/089836 (14 pages).
European Search Report dated Dec. 10, 2015, issued in related European Patent Application No. 15158696.3 (8 pages).
European Search Report dated Dec. 10, 2015, issued in related European Patent Application No. 15158701.1 (8 pages).
European Search Report dated Feb. 2, 2016, issued in related European Patent Application No. 15158686.4 (9 pages).
Non-Final Office Action dated Jun. 2, 2016, issued in related U.S. Appl. No. 14/526,816 (8 pages).
Non-Final Office Action dated Mar. 7, 2016, issued in related U.S. Appl. No. 14/527,600 (11 pages).
Non-Final Office Action dated Mar. 8, 2016, issued in related U.S. Appl. No. 14/527,410 (21 pages).
Non-Final Office Action dated May 31, 2016, issued in related U.S. Appl. No. 14/527,446 (9 pages).
Non-Final Office Action dated May 5, 2016, issued in related U.S. Appl. No. 14/527,496 (8 pages).
Non-Final Office Action dated Sep. 24, 2015, issued in related U.S. Appl. No. 14/527,522 (17 pages).
Non-Final Office Action for U.S. Appl. No. 14/527,522, dated Aug. 7, 2017, 11 pages.
Final Office Action for U.S. Appl. No. 14/755,540, dated Sep. 19, 2017, 10 pages.

\* cited by examiner

US 10,670,123 B2

POWER TRANSMISSION SYSTEM FOR VEHICLE AND VEHICLE COMPRISING THE SAME

CROSS-REFERENCE TO RELATED APPLICATIONS

This application claims priority to and benefits of Chinese Patent Application Serial Nos. 201410044230.8 and 201420057704.8, both filed with the State Intellectual Property Office of P. R. China on Jan. 30, 2014. The entire content of the above-referenced applications is incorporated herein by reference.

FIELD

The present disclosure relates to vehicles, and more particularly to a power transmission system for a vehicle and a vehicle including the power transmission system.

BACKGROUND

To reduce energy consumption, development and utilization of new energy vehicles have become a trend. As a new energy vehicle, a hybrid vehicle is driven by at least one of an engine and a motor and has various operation modes, and may operate with improved transmission efficiency and fuel economic efficiency.

However, in the related art, the power transmission system in the hybrid vehicle is generally complex in structure, bulky, low in transmission efficiency, and complicated in control. For example, a plurality of gear shift actuating elements needs to be controlled simultaneously during the gear shifting or mode switching.

SUMMARY

Embodiments of the present disclosure seek to solve at least one of the problems existing in the related art to at least some extent.

Embodiments of the present disclosure provide a power transmission system for a vehicle. The power transmission system includes an engine unit configured to generate power, a transmission unit adapted to selectively be coupled with the engine unit, and configured to transmit the power generated by the engine unit, a first motor generator coupled with the transmission unit, an output unit configured to transmit the power output by the transmission unit to at least one of front and rear wheels of the vehicle, and a synchronizer adapted to selectively synchronize the output unit and the transmission unit so as to drive the wheels of the vehicle via the power output by the output unit.

With the power transmission system for the vehicle according to embodiments of the present disclosure, the power output by at least one of the engine unit and the first motor generator may be output to the output unit via the synchronization of the synchronizer, for example, synchronizing the output unit and the transmission unit. Therefore, the power transmission system according to embodiments of the present disclosure is compact in structure and easy to control.

Moreover, the first motor generator may be configured to adjust a speed of the transmission unit. For example, the first motor generator may adjust the speed of the transmission unit with a rotating speed of the output unit as a target speed, so as to match the speed of the transmission unit with the speed of the output unit in a time efficient manner, thus reducing the synchronizing time required by the synchronization of the synchronizer and reducing the energy loss during the synchronization. Meanwhile, torque-free engagement of the synchronizer may be achieved, thus greatly improving the transmission efficiency, synchronization controllability and real-time synchronization capability of the vehicle. In addition, the life of the synchronizer may be extended, thus reducing the maintenance cost of the vehicle.

Embodiments of the present disclosure also provide a power transmission system for a vehicle. The power transmission system includes an engine unit, a first input shaft and a second input shaft coaxially fitted over the first input shaft, two driving gears being fixed on the first input shaft and the second input shaft respectively, an output shaft, two driven gears being fixed on the output shaft and meshed with the two driving gears on the first input shaft and the second input shaft respectively, a dual clutch defining an input terminal coupled with the engine unit, a first output terminal coupled with the first input shaft, and a second output terminal coupled with the second input shaft, a first motor generator coupled with one of the two driving gears on the first input shaft and the second input shaft via an intermediate gear, a differential disposed between two front wheels of the vehicle, a main reducer including a driving gear configured to rotate differentially (i.e., at a different speed) relative to the output shaft, and a driven gear disposed on the differential and meshed with the driving gear of the main reducer, an engagement gear ring fixed to the driving gear of the main reducer, a synchronizer disposed on the output shaft and configured to selectively engage with the engagement gear ring, and a second motor generator configured to drive two rear wheels of the vehicle via a reducing mechanism.

Embodiments of the present disclosure further provide a vehicle. The vehicle includes the abovementioned power transmission system.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
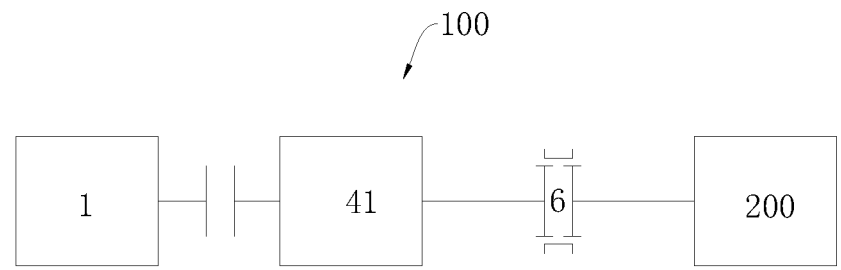
FIG. 1 is a schematic diagram of a power transmission system according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

A power transmission system 100 according to embodiments of the present disclosure will be described in detail below with reference to FIGS. 1-10. The power transmission system 100 is applicable to a vehicle, specifically a hybrid vehicle with an engine unit 1 and a motor generator.

As shown in FIGS. 1-10, the power transmission system 100 according to embodiments of the present disclosure may include an engine unit 1, a transmission unit 2a, a first motor generator 41, an output unit 5, and a synchronizer 6.

The transmission unit 2a is adapted to selectively be coupled with the engine unit 1. The engine unit 1 may selectively output a power generated by the engine unit 1 to the transmission unit 2a, for example, via a clutch. Alternatively, the transmission unit 2a may also output, for example, a starting torque from the first motor generator 41 to the engine unit 1, so as to start the engine unit 1. In the context of the present disclosure, the phase "the transmission unit 2a is coupled with the engine unit 1" means that the power can be transferred between the engine unit 1 and the transmission unit 2a directly or via other components, so that the coupling between the transmission unit 2a and the engine unit 1 is also referred to as a power coupling.

The engine unit 1 generates energy by mixing liquid or gaseous fuel and air and then combusting the mixed fuel and air therein, and the energy is converted into mechanical energy. The engine unit 1 of the vehicle may adopt a four-stroke gasoline or diesel engine. The engine unit 1 may generally include a block, a crank-connecting rod mechanism, a valve mechanism, a supply system, an ignition system, a cooling system, a lubrication system and the like.

The block is an assembled body of individual mechanisms and systems of the engine unit 1. The crank-connecting rod mechanism may convert the linear reciprocating motion of a piston into the rotary motion of a crankshaft, and output a drive force. The valve mechanism is configured to charge or discharge a gas at a predetermined time, so as to ensure the smooth performing of each cycle of the engine unit 1. The supply system may supply a mixture of oil and gas to a cylinder for combustion. The cooling system is configured to cool the engine unit 1, so as to ensure that the operating temperature of the engine unit 1 is within a suitable temperature range. The lubrication system is configured to lubricate individual motion pairs in the engine unit 1, so as to reduce the wear and energy loss.

It would be appreciated that the engine unit 1 as well as structures and operation principles of individual sub-systems and sub-mechanisms of the engine unit 1 are well known to those skilled in the art, so the detailed description thereof will be omitted here for clarity purpose.

The first motor generator 41 is coupled with the transmission unit 2a. In other words, the first motor generator 41 cooperates with the transmission unit 2a to transmit the power. The first motor generator 41 may drive the transmission unit 2a, while the transmission unit 2a may drive the first motor generator 41 as well.

For example, the engine unit 1 may output at least a part of the power generated thereby to the first motor generator 41 via the transmission unit 2a, and the first motor generator 41 may generate electricity and convert mechanical energy into electric energy to be stored in an energy storage component such as a battery pack 300. As another example, the first motor generator 41 may convert electric energy from the battery pack 300 into mechanical energy, and output the mechanical energy to the output unit 5 via the transmission unit 2a to drive the vehicle.

The first motor generator 41 is a motor having functions of both a motor and a generator. As used herein, the term "motor generator" refers to a motor having functions of both a motor and a generator, unless specified otherwise.

The output unit 5 is configured to transmit power transmitted by the transmission unit 2a to wheels 200 of the vehicle. In short, the output unit 5 is adapted to output the power from the transmission unit 2a.

The synchronizer 6 is adapted to selectively synchronize the output unit 5 and the transmission unit 2a so as to output the power via the output unit 5 to drive the wheels 200 of the vehicle.

Here, the function of the synchronizer 6 may be to synchronize the output unit 5 and the transmission unit 2a. Under the action of the synchronizer 6, the output unit 5 and the transmission unit 2a may operate synchronously, such that the power from the transmission unit 2a may be output with the output unit 5 as a power output terminal. However, when the transmission unit 2a and the output unit 5 are not synchronized by the synchronizer 6, the power from the transmission unit 2a may not be output to the wheels 200 via the output unit 5 directly.

The synchronizer 6 functions to switch the power. When the synchronizer 6 is in an engaged state, the power from the transmission unit 2a may be output via the output unit 5 to drive the wheels 200; and when the synchronizer 6 is in a disengaged state, the transmission unit 2a may not transmit the power to the wheels 200 via the output unit 5. In this way, by controlling the synchronizer 6 to switch between the engaged state and the disengaged state, the switching of the drive mode of the vehicle may be realized.

Compared to a clutch, the synchronizer 6 has the following advantages.

When the synchronizer 6 is in a disengaged state, the power transmitting between the engine unit 1, the transmission unit 2a, the first motor generator 41 and the wheels 200 (shown in FIG. 1) needs to be interrupted, such that the operations such as electricity generating, driving, or power/torque transmission may not influence each other, which is important in reducing the energy consumption of the vehicle. The synchronizer 6 may meet this requirement well. However, incomplete separation of friction plates usually occurs in the clutch, thus increasing the friction loss and energy consumption.

When the synchronizer 6 is in an engaged state, the synthesized (coupled) driving force of the engine unit 1 and the first motor generator 41 needs to be transferred to the wheels 200 after the torque multiplication of the transmission unit 2a, or the driving force of the wheels 200 needs to be transferred to the first motor generator 41 for generating electricity, which requires that the power coupling device transmit a large torque and have high stability. The synchronizer 6 may meet this requirement. However, if the clutch is used, an oversize clutch which does not match with the entire system (including an engine, a transmission, a motor, etc.) needs to be designed, thus increasing the arrangement difficulty, the weight, and the cost, and having the risk of slipping under the action of an impact torque.

Moreover, the first motor generator 41 may adjust the speed of the transmission unit 2a. For example, the first motor generator 41 may adjust the speed of the transmission unit 2a with the rotating speed of the output unit 5 as a target speed, so as to match the speed of the transmission unit 2a with the speed of the output unit 5 in a time efficient manner, thus reducing the time required by the synchronization of the synchronizer 6 and reducing the energy loss. Meanwhile, no torque engagement of the synchronizer 6 may be achieved, thus greatly improving the transmission efficiency, synchronization controllability and real-time synchronization of the vehicle. In addition, the life of the synchronizer 6 may be further extended, thus reducing the maintenance cost of the vehicle. Furthermore, the power transmission system 100 according to embodiments of the present disclosure is compact in structure and easy to control.

Figure 7:
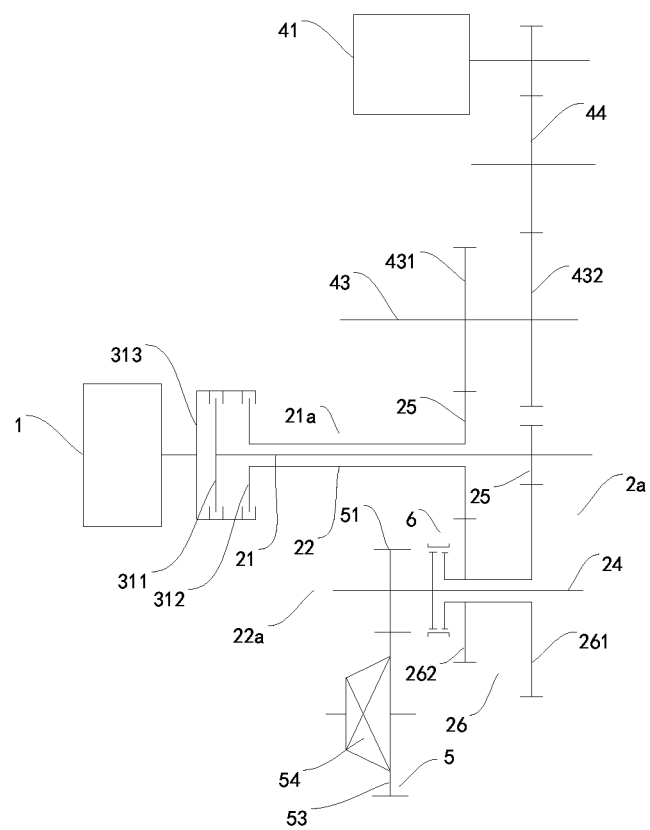
FIG. 7 is a schematic view of a power transmission system according to yet another embodiment of the present disclosure.
Figure 8:
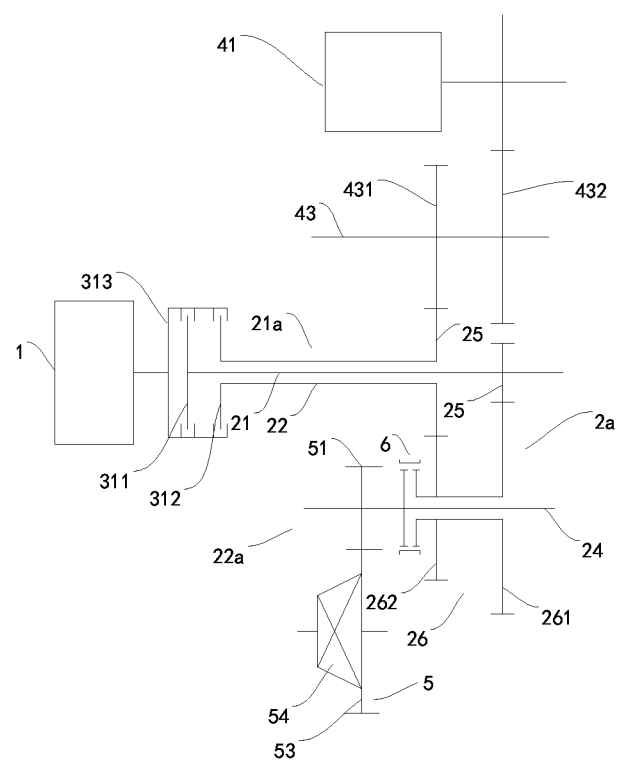
FIG. 8 is a schematic view of a power transmission system according to yet another embodiment of the present disclosure.

In some embodiments, as shown in FIGS. 7 and 8, the transmission unit 2a includes a transmission power input part 21a and a transmission power output part 22a. The transmission power input part 21a is selectively engaged with the engine unit 1, so as to transmit the power generated by the engine unit 1. The transmission power output part 22a is configured to output the power from the transmission power input part 21a to the output unit 5 via the synchronizer 6.

As shown in FIGS. 2-6 and 7, the transmission power input part 21a includes at least two input shaft (e.g., a first input shaft 21, a second input shaft 22) and a driving gear 25 mounted on each input shaft. The input shaft is selectively engaged with the engine unit 1, so as to transmit the power generated by the engine unit 1. In other words, when the engine unit 1 needs to output the power to the input shaft, the engine unit 1 may be engaged with the input shaft, such that the power output by the engine unit 1 may be transferred to the input shaft. The engagement between the engine unit 1 and the input shaft may be achieved by means of a clutch (e.g., a dual clutch 31), which will be described in detail below.

As shown in FIGS. 2-6 and 7, the transmission power output part 22a includes an output shaft 24, and a driven gear 26 mounted on the output shaft 24 and meshed with the driving gear 25 on the input shaft.

As shown in FIGS. 2-5, the output shaft 24 is configured to output at least a part of the power transmitted by the input shaft. Specifically, the output shaft 24 and the first input shaft 21 and the second input shaft 22 cooperate with each other to transmit the power. For example, the power transmitting between the output shaft 24 and the input shaft may be realized by means of the driving gear 25 and the driven gear 26.

It would be appreciated that the power transmitting between the output shaft 24 and the input shaft is not limited to these embodiments. In some embodiments, the power transmitting manner between the output shaft 24 and the input shaft may be selected according to practical applications. For example, the power transmitting between the output shaft 24 and the input shaft may also be realized by means of a belt transmission mechanism, or a rack and pinion transmission mechanism.

The output shaft 24 is configured to transmit at least a part of the power on the input shaft. For example, when the power transmission system 100 is in a certain transmission mode, for example, the first motor generator 41 generates electricity, a part of the power on the input shaft may be used for the electricity generating of the first motor generator 41, and the other part of the power on the input shaft may be used to drive the vehicle to run. Alternatively, all power on the input shaft may be used for the electricity generating of the first motor generator 41.

In some embodiments, the power transmitting between the first motor generator 41 and one of the input shaft and the output shaft 24 may be direct or indirect. As used herein, the term "direct power transmitting" means that the first motor generator 41 is directly coupled with a corresponding one of the input shaft and the output shaft 24 for power transmitting, without using any intermediate transmission components such as a speed changing device, a clutch device, or a transmission device. For example, an output terminal of the first motor generator 41 is directly connected rigidly with one of the input shaft and the output shaft 24. The direct power transmitting has advantages of eliminating the intermediate transmission components and reducing the energy loss during the power transmitting.

As used herein, the term "indirect power transmitting" refers to any other power transmitting manners other than the direct power transmitting, for example, the power transmitting by means of intermediate transmission components such as a speed changing device, a clutch device, or a transmission device. The indirect power transmitting has advantages of enabling convenient arrangement and being capable of obtaining the desired transmission ratio by providing a speed changing device and the like.

The output unit 5 may be used as a power output terminal of the output shaft 24 for outputting the power on the output shaft 24. The output unit 5 and the output shaft 24 may rotate differentially, i.e. the output unit 5 and the output shaft 24 may not rotate synchronously. In other words, there is a rotating speed difference between the output unit 5 and the output shaft 24, and the output unit 5 and the output shaft 24 are not connected rigidly with each other.

The synchronizer 6 is disposed on the output shaft 24. Specifically, as shown in FIGS. 1-6, the synchronizer 6 may include a splined hub 61 and a synchronizing sleeve 62. The splined hub 61 may be fixed on the output shaft 24, the splined hub 61 rotates synchronously with the output shaft 24, the synchronizing sleeve 62 may move in an axial direction of the output shaft 24 relative to the splined hub 61 so as to selectively engage with the output unit 5, such that the output unit 5 rotates synchronously with the output shaft 24. In this way, the power may be transferred from the output unit 5 to the wheels 200, thus driving the wheels 200. However, it would be appreciated that the structure of the synchronizer 6 is not limited to this embodiment.

With the power transmission system 100 according to embodiments of the present disclosure, the power output by at least one of the engine unit 1 and the first motor generator 41 may be output from the output unit 5 by the engagement of the synchronizer 6, such that the power transmission system 100 is compact in structure and easy to control. Moreover, during the switching of the operating conditions of the vehicle, it is possible for the synchronizer 6 to switch from a disengaged state to an engaged state, and the first motor generator 41 may adjust the rotating speed of the output shaft 24 with the rotating speed of the output unit 5 as a target speed, so as to match the rotating speed of the output shaft 24 with the rotating speed of the output unit 5 in a short time, thus facilitating the engagement of the synchronizer 6, greatly improving the transmission efficiency and reducing the energy loss. Furthermore, no torque engagement of the synchronizer 6 may be achieved, i.e. the radial friction force is much smaller than the average value in the related art or even there is no radial friction force during the engagement of the synchronizer 6.

In some embodiments, as shown in FIGS. 2-9, there are a plurality of the input shafts, i.e. two or more input shafts. The plurality of input shafts are coaxially nested sequentially, for example, the input shafts are coaxial and fitted over one another sequentially. For example, if there are N input shafts, the $K^{th}$ input shaft is hollow and fitted over the $(K-1)^{th}$ input shaft, where N≥K≥2, and central axes of the N input shafts coincide with each other.

In the example shown in FIGS. 2-5 and 7-9, when there are two input shafts, i.e. the first input shaft 21 and the second input shaft 22, the second input shaft 22 is fitted over the first input shaft 21 and central axes of the two input shafts coincide with each other. As another example, in the example shown in FIG. 6, when there are three input shafts, i.e. the first input shaft 21, the second input shaft 22 and a third the input shaft 23, the third input shaft 23 is fitted over the second input shaft 22, the second input shaft 22 is fitted over the first input shaft 21, and central axes of the three input shafts coincide with each other.

When the engine unit 1 transmits the power to an input shaft or is coupled with an input shaft for power transmitting, the engine unit 1 may be selectively engaged with one of the input shafts. In other words, when the power from the engine unit 1 needs to be output, the output terminal of the engine unit 1 may be engaged with one of the input shafts, so as to rotate synchronously with the one of the input shafts. When the engine unit 1 does not need to operate or the engine unit 1 is idle, the engine unit 1 may be disconnected from individual input shafts respectively. In other words, the engine unit 1 is not coupled with any input shaft, so as to interrupt the power transmission between the engine unit 1 and individual input shafts.

Further, as shown in FIGS. 2-6, each input shaft has a corresponding driving gear 25 fixed thereon, and the driving gear 25 rotates synchronously with the input shaft. The fixing arrangement between the driving gear 25 and the corresponding input shaft is not limited. The driving gear 25 and the corresponding input shaft may be fixed by, for example, key fit or hot pressing, or may be formed integrally, as long as the synchronous rotation of the driving gear 25 and the corresponding input shaft is ensured.

In some embodiments, a plurality of driven gears 26 are fixed on the output shaft 24, and the driven gears 26 rotate synchronously with the output shaft 24. By way of example and without limitation, the fixing between the driven gear 26 and the output shaft 24 may be realized by key fit or hot pressing, or the driven gear 26 and the output shaft 24 may be formed integrally.

However, the present disclosure is not limited to this. For example, the number of the driving gears 25 on each input shaft is not limited to one, and accordingly a plurality of driven gears 26 can be fixed on the output shaft 24 to form a plurality of gears.

As shown in FIGS. 2-6, the driven gears 26 are meshed with the driving gears 25 on the input shafts respectively. In one embodiment, the number of the driven gears 26 may be the same as that of the input shafts. For example, when there are two driven gears 26, there are two input shafts, such that the two driven gears 26 may be meshed with the driving gears 25 on the two input shafts to transmit the power, so as to make the two pairs of gears form two gear sets for power transmission.

In one embodiment, three or more input shafts may be provided according to the power transmitting requirements, and each input shaft may be provided with one driving gear 25. Therefore, the larger the number of the input shafts, the larger the number of the gears is, and the wider range of the transmission ratio of the power transmission system 100 is, so as to adapt to the power transmitting requirements of various vehicles.

In some embodiments, as shown in FIGS. 2-5, the input shafts include the first input shaft 21 and the second input shaft 22. The second input shaft 22 is fitted over the first input shaft 21. The second input shaft 22 is a hollow shaft, and the first input shaft 21 is preferably a solid shaft. Alternatively, the first input shaft 21 may also be a hollow shaft.

The first input shaft 21 may be supported by bearings. In order to ensure the ride comfort of the first input shaft 21 during the power transmitting, preferably, a plurality of bearings are provided and may be disposed in an axial direction of the first input shaft 21 at a position not influencing the assembly of other components. Similarly, the second input shaft 22 may also be supported by bearings.

Further, as shown in FIGS. 2-5, a dual clutch 31 is disposed between the engine unit 1 and the first and second input shafts 21, 22. The dual clutch 31 may be a dry dual clutch 31 or a wet dual clutch 31.

The dual clutch 31 has an input terminal 313, a first output terminal 311 and a second output terminal 312. The engine unit 1 is coupled with the input terminal 313 of the dual clutch 31. Specifically, the engine unit 1 may be coupled with the input terminal 313 of the dual clutch 31 via for example, a flywheel, a damper, or a torsion plate.

The first output terminal 311 of the dual clutch 31 is coupled with the first input shaft 21, such that the first output terminal 311 rotates synchronously with the first input shaft 21. The second output terminal 312 of the dual clutch 31 is coupled with the second input shaft 22, such that the second output terminal 312 rotates synchronously with the second input shaft 22.

The input terminal 313 of the dual clutch 31 may be a shell of the dual clutch 31, and the first output terminal 311 and the second output terminal 312 of the dual clutch 31 may be two driven discs. Generally, the shell is disconnected from the two driven discs, i.e. the input terminal 313 being disconnected from the first output terminal 311 and the second output terminal 312. When one driven disc needs to be engaged, the shell is controlled to engage with the corresponding driven disc to rotate synchronously with the driven disc, i.e. the input terminal 313 being engaged with one of the first output terminal 311 and the second output terminal 312, such that the power transmitted from the input terminal 313 may be output via one of the first output terminal 311 and the second output terminal 312. Generally, the shell will not be engaged with the two driven discs simultaneously.

It would be appreciated that the engagement of the dual clutch 31 is influenced by a control strategy. The control strategy may be set according to a desired power transmitting mode, such that it is possible to switch between a mode in which the input terminal 313 is disconnected from the first output terminal 311 and the second output terminal 312 and a mode in which the input terminal 313 is engaged with one of the first output terminal 311 and the second output terminal 312.

In the example shown in FIGS. 2-5, since the input shaft has a coaxial structure and each input shaft is provided with only one driving gear 25, the transmission unit 2a has two different gears, and the engine unit 1 may output the power to the output unit 5 via the two gears, while the synchronizer 6 is always in the engaged state, i.e. engaging the output shaft 24 with the output unit 5.

During the gear shift, the synchronizer 6 does not need to be first disengaged and then move axially to engage with other gears, and only the engagement/disengagement of the dual clutch 31 needs to be controlled, while the synchronizer 6 is always in the engaged state. In this way, when the engine unit 1 outputs the power to the output unit 5, only one gear shift actuating element, i.e. the dual clutch 31 needs to be controlled, without requiring to control the synchronizer 6, thus simplifying the control strategy greatly, reducing the number of engagement/disengagement times of the synchronizer 6, and extending the life of the synchronizer 6.

In some embodiments, the first motor generator 41 is configured to cooperate with one of the driving gear 25 and the driven gear 26 for power transmitting. In other words, indirect power transmitting between the first motor generator 41 and one of the input shaft and the output shaft 24 is performed.

Further, alternatively, an intermediate transmission mechanism may be disposed between the first motor generator 41 and the corresponding gear, and by way of example and without limitation, the intermediate transmission mechanism may be a worm and worm gear transmission mechanism, a one-stage or multi-stage gear pair transmission mechanism, or a chain wheel transmission mechanism, or a combination of the above transmission mechanisms in the case of no conflicting. In this way, the first motor generator 41 may be provided in different locations as needed, thus reducing the arrangement difficulty of the first motor generator 41.

In order to facilitate the spatial arrangement, in one embodiment, the first motor generator 41 may transmit the power via an intermediate gear 411. For example, in the example shown in FIGS. 2-3, indirect power transmitting between the first motor generator 41 and the driving gear 25 on the first input shaft 21 via the intermediate gear 411 is performed. As another example, in the example shown in FIG. 2, indirect power transmitting between the first motor generator 41 and the driving gear 25 on the second input shaft 22 via the intermediate gear 411 is performed.

However, the present disclosure is not limited to this. In other embodiments, the first motor generator 41 is configured to connect with one of the first input shaft 21 and the output shaft 24. For example, in the example shown in FIG. 4, the first motor generator 41 is directly connected with the first input shaft 21. As another example, in the example shown in FIG. 5, the first motor generator 41 is directly connected with the output shaft 24. Direct connection between the first motor generator 41 and the corresponding shaft may make the structure of the power transmission system 100 more compact, and decrease the circumferential dimension of the power transmission system 100, such that the power transmission system 100 may be easily disposed in a compartment of the vehicle.

Figure 4:
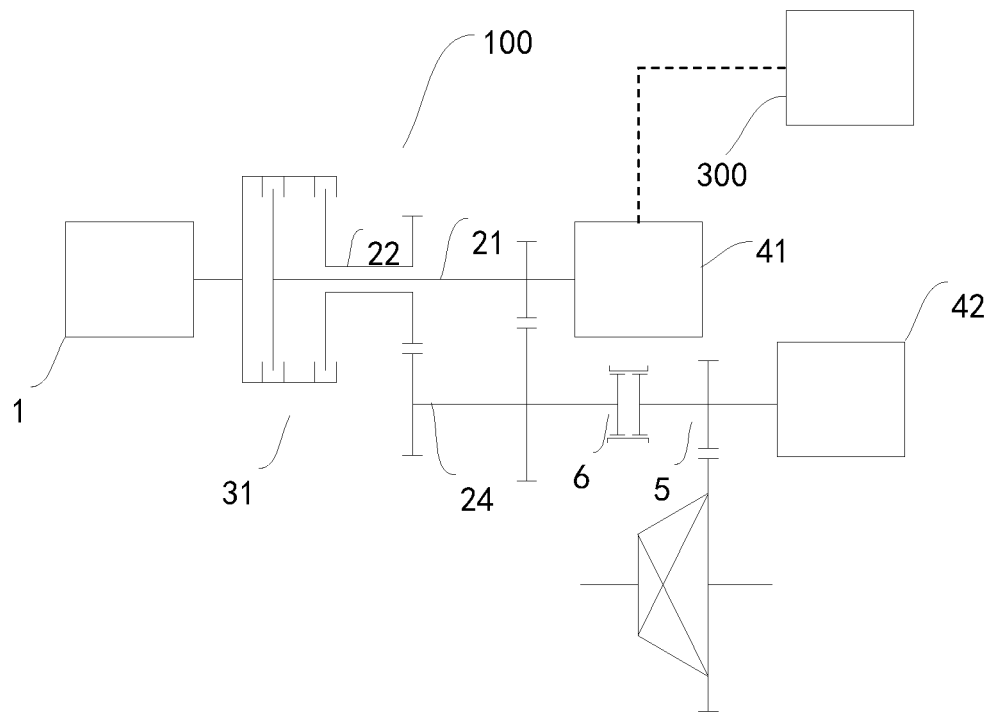
FIG. 4 is a schematic view of a power transmission system according to still another embodiment of the present disclosure.

In one embodiment, as shown in FIG. 4, the first motor generator 41 is arranged coaxially with the first input shaft 21, and the first motor generator 41 is arranged coaxially with the engine unit 1, i.e. a rotation axis of a rotor of the first motor generator 41 substantially coinciding with a rotation axis of a crankshaft of the engine unit 1. Therefore, the power transmission system 100 is more compact in structure.

In some embodiments, as shown in FIGS. 2-6, the output unit 5 may include an output gear 51 and an engagement gear ring 52. The output gear 51 may rotate relative to the output shaft 24, i.e. rotating differentially relative to the output shaft 24, and the engagement gear ring 52 is fixedly connected with the output gear 51. The engagement gear ring 52 can rotate synchronously with the output gear 51.

Therefore, when the synchronizer 6 needs to engage the output unit 5 with the output shaft 24, the synchronizing sleeve 62 of the synchronizer 6 may axially move toward the engagement gear ring 52, and after the rotating speed of the output unit 5 is synchronized with the rotating speed of the output shaft 24, the synchronizing sleeve 62 may be engaged with the engagement gear ring 52, such that a rigid connection is formed between the output shaft 24, the synchronizer 6 and the output unit 5, so as to rotate the output shaft 24, the synchronizer 6 and the output unit 5 synchronously.

In order to reduce the intermediate transmission components, reduce the energy loss, and enhance the transmission efficiency of the power transmission system 100 as far as possible, in some embodiments, as shown in FIGS. 2-6, the output gear 51 may be a driving gear of a main reducer and directly meshed with a driven gear 53 of the main reducer to output the power, so as to drive the wheels 200. However, the present disclosure is not limited to this, and other intermediate transmission components may also be disposed between the output gear 51 and the main reducer.

In some embodiments, as shown in FIGS. 2-6, the power transmission system 100 in this embodiment further includes a second motor generator 42. An output terminal of the second motor 42 is adapted to cooperate with the output unit for power transmitting. In some embodiments, the output terminal of the second motor 42 may be the motor shaft of the second motor 42.

In some embodiments, when the synchronizer 6 switches from a disengaged state to an engaged state with the output unit 5, the first motor generator 41 is configured to adjust the rotating speed of the output shaft 24.

In some embodiments, when the synchronizer 6 switches from a disengaged state to an engaged state with the output unit 5, the second motor generator 42 is configured to adjust the rotating speed of the output unit 5.

In some embodiments, when the synchronizer 6 switches from a disengaged state to an engaged state with the output unit 5, the first motor generator 41 is configured to adjust the rotating speed of the output shaft 24; and the second motor generator 42 is configured to adjust the rotating speed of the output unit 5.

Specifically, when the second motor generator 42 is configured to adjust the rotating speed of the output unit 5, for example, during the period that the synchronizer 6 changed from the disengaged state to the engaged state. During this period, the second motor generator 42 may adjust the rotating speed of the output unit 5, so that the rotating speed of the output shaft 24 and the rotating speed of the output unit 5 are matched in a short time, thus facilitating the engagement of the synchronizer 6, which may greatly improve the transmission efficiency of the vehicle.

In addition, and the first motor generator 41 may adjust the rotating speed of the output shaft 24 with the rotating speed of the output unit 5 as a target speed, so as to match the rotating speed of the output shaft 24 with the rotating speed of the output unit 5 in a short time, thus facilitating the engagement of the synchronizer 6, which may greatly improve the transmission efficiency of the vehicle and reducing the energy loss during the synchronization. Furthermore, torque-free engagement of the synchronizer 6 may be achieved, i.e. the radial friction force is much smaller than the average value in the related art or even there may be no radial friction force during the engagement of the synchronizer 6.

In short, alternatively, the first motor generator 41 may adjust the rotating speed of the output shaft 24 independently. Alternatively, the second motor generator 42 may adjust the rotating speed of the output unit 5 independently. Further alternatively, the first motor generator 41 and the second motor generator 42 may respectively adjust the rotating speed of the output unit 5 and the rotating speed of the output unit 5 simultaneously.

In this way, the power output of the power from the transmission unit 2a may be controlled by the engagement/disengagement of the synchronizer 6, and when the synchronizer 6 switches from the disengaged state to the engaged state, at least one of the first motor generator 41 and the second motor generator 42 may compensate for the speeds of the output shaft 24 and the output unit 5 respectively, so as to match the rotating speed of the output shaft 24 with the rotating speed of the output unit 5 rapidly, thus realizing torque-free engagement of the synchronizer 6 rapidly.

The connection between the second motor generator 42 and the output unit 5 can have various arrangements, and the specific arrangement can be formed with consideration of various factors, such as space, cost, motor speed and so on. For example, as shown in FIGS. 2-6, the second motor generator 42 may be directly connected with the output unit 5, and the second motor generator 42 is arranged coaxially with the output shaft 24. Therefore, the power transmission system 100 is more compact in structure. However, the present disclosure is not limited to this, by way of example and without limitation, indirect power transmitting between the second motor generator 42 and the output unit 5 can be provided via a gear transmission mechanism, a worm and worm gear transmission mechanism, or a chain wheel transmission mechanism.

In some embodiments, the power transmission system 100 may also include a battery pack 300. The battery pack 300 is connected with the first motor generator 41 and the second motor generator 42 respectively. Therefore, the first motor generator 41 is driven by the engine unit 1 to generate electricity or electric energy recovered by the first motor generator 41 during the braking may be supplied to and stored in the battery pack 300, and electric energy recovered by the second motor generator 42 during the braking may also be supplied to and stored in the battery pack 300. When the vehicle is in an EV (electric vehicle) mode, the battery pack 300 may supply electric energy to at least one of the first motor generator 41 and the second motor generator 42, or to the second motor generator 42 independently.

However, the present disclosure is not limited to this embodiment. In some embodiments, the battery pack 300 is connected with one of the first motor generator 41 and the second motor generator 42.

Figure 10:
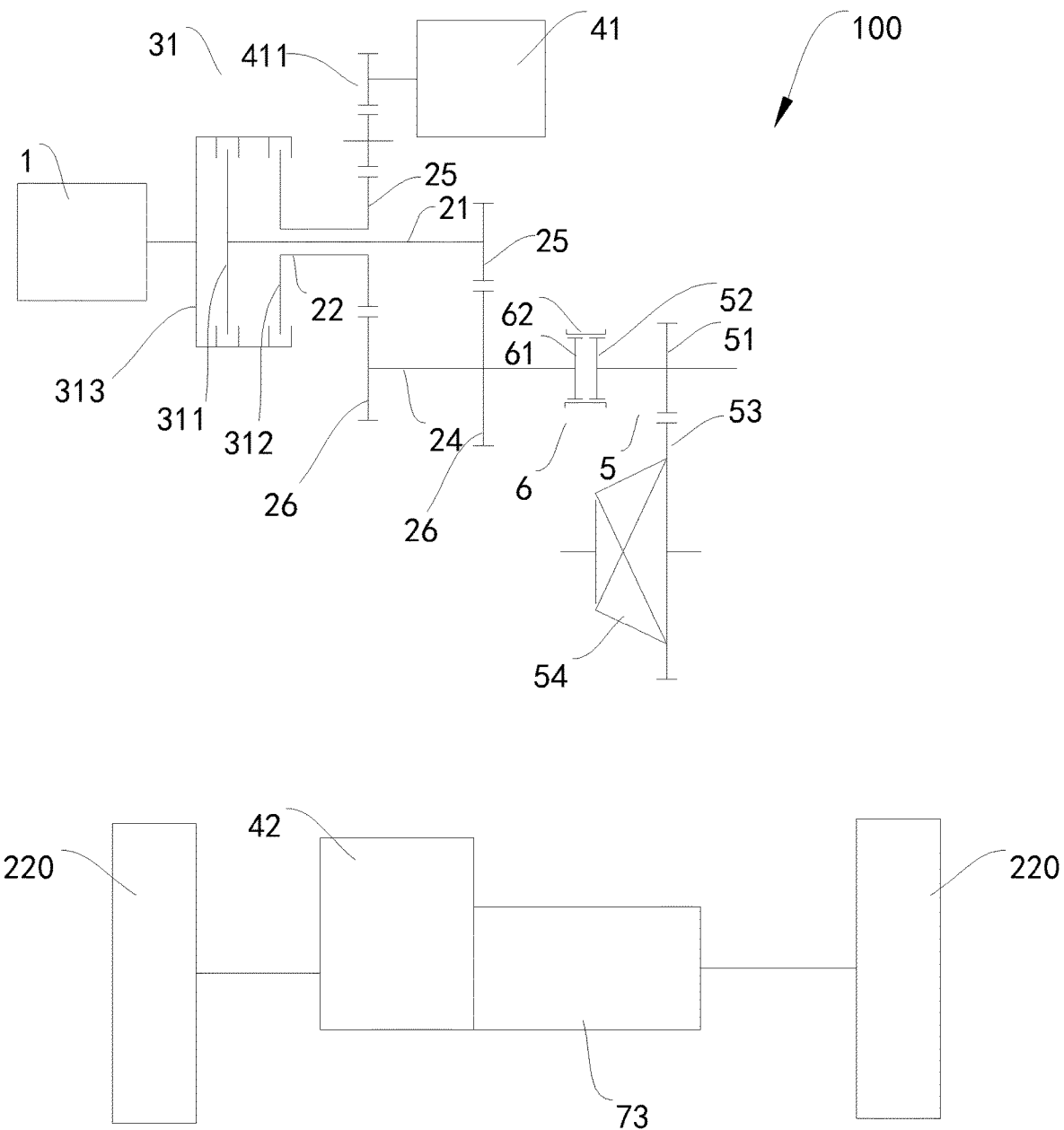
FIG. 10 is a schematic view of a power transmission system according to yet another embodiment of the present disclosure.

In some embodiments, as shown in FIG. 10, the output unit 5 is configured to drive a first pair of wheels of the vehicle, and the second motor generator 42 is configured to drive a second pair of wheels of the vehicle. The first pair of wheels is one pair of wheels selected from a pair of front wheels and a pair of rear wheels of the vehicle, and the second pair of wheels is the other pair of wheels selected from the pair of front wheels and the pair of rear wheels. Specifically, as shown in FIG. 10, the output unit 5 is configured to drive the front wheels (not shown), and the second motor generator 42 is configured to drive the rear wheels 220.

The output unit 5 may transmit power to the differential 54, and the differential 54 may distribute the power to the two front wheels. In an embodiment, one second motor generator 42 is provided. The second motor generator 42 may drive the second pair of wheels, such as the rear wheels 220, via a speed changing mechanism 73. The speed changing mechanism 73 is a speed reducing mechanism. The speed reducing mechanism may include, but is not limited to, a gear reducing mechanism, or a worm and worm gear reducing mechanism.

Figure 6:
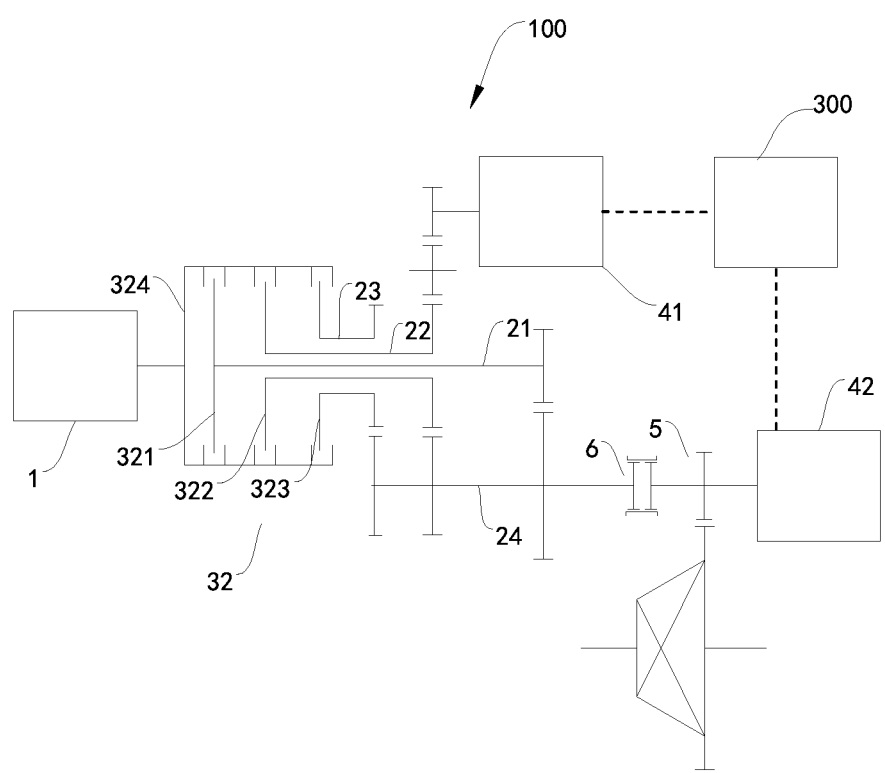
FIG. 6 is a schematic view of a power transmission system according to yet another embodiment of the present disclosure.

In a variation of the above embodiments described with respect to the power transmission system 100, as shown in FIG. 6, the input shafts include three shafts, i.e. the first input shaft 21, the second input shaft 22 and the third input shaft 23, the second input shaft 22 is fitted over the first input shaft 21, and the third input shaft 23 is fitted over the second input shaft 22.

In such a variation, the power transmission system 100 further includes a triple clutch 32. The triple clutch 32 has an input terminal 324, a first output terminal 321, a second output terminal 322 and a third output terminal 323. The engine unit 1 is coupled with the input terminal 324 of the triple clutch 32, the first output terminal 321 of the triple clutch 32 is coupled with the first input shaft 21, the second output terminal 322 of the triple clutch 32 is coupled with the second input shaft 22, and the third output terminal 323 of the triple clutch 32 is coupled with the third input shaft 23.

Similarly, the input terminal 324 of the triple clutch 32 may be a shell thereof, and the first, second and third output terminals 321, 322, 323 of the triple clutch 32 may be three driven discs. The input terminal 324 may be engaged with one of the first, second and third output terminals 321, 322, 323, or may be disconnected with the first, second and third output terminals 321, 322, 323. It would be appreciated that the operation principle of the triple clutch 32 is similar to that of the dual clutch 31, so the detailed description thereof will be omitted here.

In such a variation, other parts such as the power transmitting manner between the first motor generator 41 and the first input shaft 21 or the output shaft 24, the connecting manner and positions of the second motor generator 42 and the output unit 5 as well as the structure of the output unit 5, are similar to those described with respect to the dual clutch 31, so the detailed description thereof will be omitted here.

Figure 9:
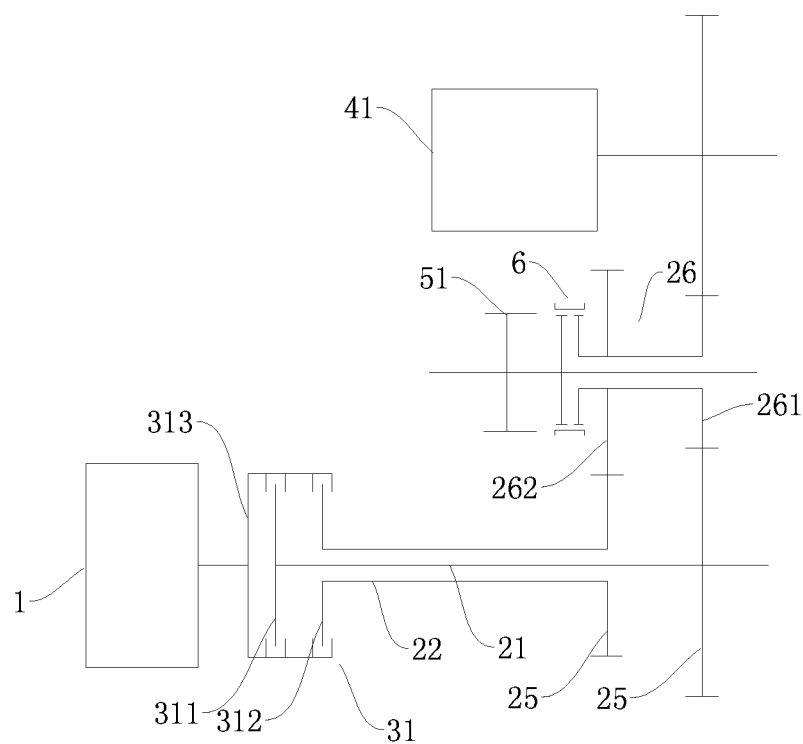
FIG. 9 is a schematic view of a power transmission system according to yet another embodiment of the present disclosure.

In another variation of the above embodiments described with respect to the power transmission system 100, as shown in FIGS. 7-9, in this power transmission system 100, the driven gear 26 is a linked gear, and the linked gear 26 is freely fitted over the output shaft 24 and rotates differentially relative to the output shaft 24. The synchronizer 6 is disposed on the output shaft 24 and may be selectively engaged with the linked gear 26.

In such a variation, specifically, two input shafts are provided, i.e. the first input shaft 21 and the second input shaft 22, and each input shaft is provided with one driving gear 25. The linked gear 26 is a double-linked gear. The double-linked gear 26 has a first gear part 261 and a second gear part 262, and the first gear part 261 and the second gear part 262 are meshed with two driving gears 25 respectively.

When the power transmission system 100 in this embodiment transmits the power, the synchronizer 6 may be engaged with the double-linked gear 26, such that the power output by at least one of the engine unit 1 and the first motor generator 41 may be output via the output unit 5 (e.g., the driving gear 51 of the main reducer).

In this embodiment, the power transmitting between the first motor generator 41 and the output shaft 24 may be direct or indirect, and is similar to that described in the above embodiments, so the detailed description thereof will be omitted here. The arrangement of other components such as the clutch (e.g., the dual clutch 31 or the triple clutch 32) between the engine unit 1 and the input shaft is similar to that described in the above embodiments, so the detailed description thereof will be omitted here.

By using the linked gear 26, the power transmission system 100 is more compact in structure and easy to arrange, and the number of the driven gears may be decreased so as to reduce the axial dimension of the power transmission system 100, thus reducing the cost and the arrangement difficulty.

Furthermore, the synchronizer 6 may be controlled by one separate fork, such that the control steps are simple and the reliability is high.

The construction and operating conditions of the power transmission system 100 in various examples will be simply described below with reference to FIGS. 2-10.

Example 1

Figure 2:
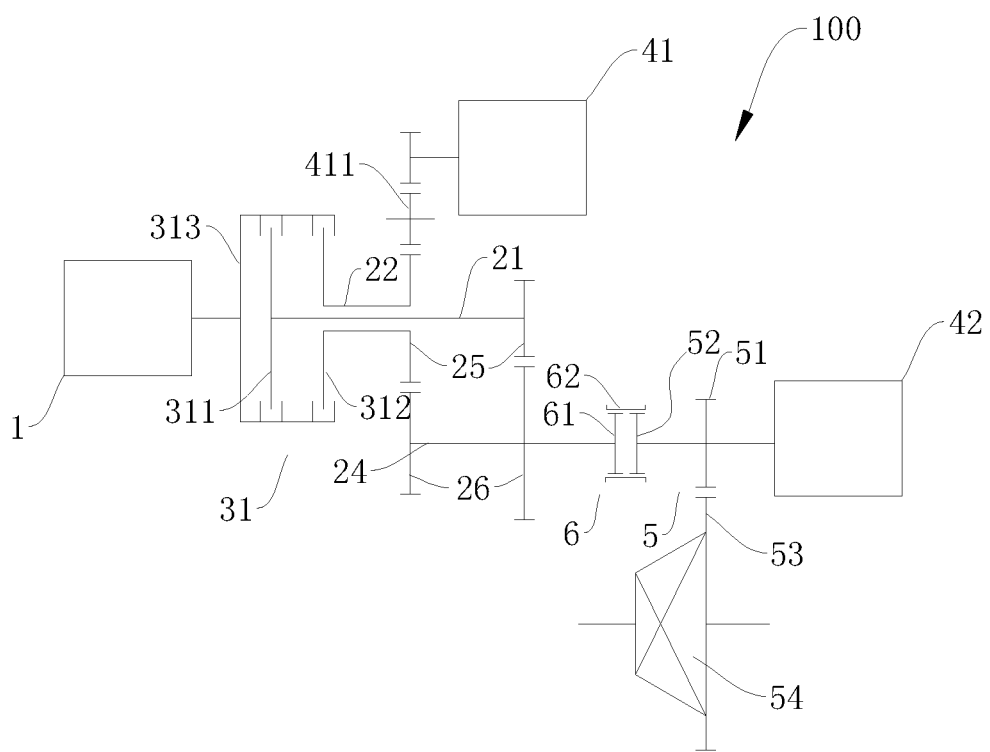
FIG. 2 is a schematic view of a power transmission system according to an embodiment of the present disclosure.

As shown in FIG. 2, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, and indirect power transmitting between the first motor generator 41 and the driving gear 25 on the second input shaft 22 is performed via one intermediate gear 411. The output shaft 24 is provided with two driven gears 26, and the two driven gears 26 are meshed with the driving gears 25 on the first input shaft 21 and the second input shaft 22, so as to form two gear sets.

The synchronizer 6 is disposed on the output shaft 24, the driving gear (i.e. the output gear 51) of the main reducer may rotate differentially relative to the output shaft 24, the engagement gear ring 52 adapted to the synchronizer 6 is fixed at a left side of the driving gear of the main reducer.

The synchronizer 6 is configured to control the power switching. That is, by controlling the engagement/disengagement of the synchronizer 6, the power of at least one of the engine unit 1 and the first motor generator 41 may be selectively output via the output unit 5.

The output terminal of the second motor generator 42 is directly coupled with the driving gear of the main reducer. The driving gear 51 of the main reducer is externally meshed with the driven gear 53 of the main reducer. The driven gear 53 may be fixed on the differential 54, so as to transfer the power to the differential 54. The differential 54 distributes the power and adaptively transfers the distributed power to half axles at two sides of the vehicle, so as to drive the wheels 200. The second motor generator may transmit power to the wheels 200 via the output unit 5.

With the power transmission system 100 in this example, by the engagement or disengagement of the dual clutch 31, the power from the engine unit 1 may be transferred to the output shaft 24 with two different transmission ratios respectively. The first motor generator 41 may transfer the power to the output shaft 24 with a constant transmission ratio via a shift gear set. When the synchronizer 6 is in an engaged state, the power from the output shaft 24 may be transferred to the wheels 200 via the main reducer and the differential 54. When the synchronizer 6 is in a disengaged state, the power from the output shaft 24 may not be transferred to the wheels 200.

The power transmission system 100 in this example may have at least the following operating conditions: a pure EV (electric vehicle) operating condition of the second motor generator 42, a pure EV (electric vehicle) operating condition of the first and second motor generators 41, 42, a parallel operating condition, a series operating condition, and a braking/decelerating feedback operating condition.

First Operating Condition

This operating condition is a pure EV operating condition of the second motor generator 42. The dual clutch 31 is in a disengaged state, the synchronizer 6 is in a disengaged state, neither the engine unit 1 nor the first motor generator 41 operates, and the second motor generator 42 drives the wheels 200 via the driving gear 51 of the main reducer. This operating condition is mainly applicable to a situation where a load is small and an electric quantity of a battery is large, for example, during uniform motions or under urban operating conditions.

This operating condition has the advantages that since the second motor generator 42 directly drive the wheels 200, the transmission chain is the shortest, and the number of operating components is the smallest, thus achieving maximum transmission efficiency and minimum noise.

Second Operating Condition

This operating condition is a pure EV (electric vehicle) operating condition of two motor generators, i.e. the first and second motor generators 41, 42. The dual clutch 31 is in a disengaged state, the synchronizer 6 is in an engaged state, the engine unit 1 does not operate. The first motor generator 41 transmits the power to the driving gear 51 of the main reducer via a shift gear set (including the driving gear 25 and the driven gear 26 meshed correspondingly with the driving gear 25) and the synchronizer 6, and the second motor generator 42 drive the wheels 200 via the driving gear of the main reducer.

This operating condition is mainly applicable to a situation where a load is large and an electric quantity of a battery is large, for example, during acceleration, climbing, overtaking, or high-speed running.

This operating condition has the advantages of having better dynamic performance than a single-motor drive, and having better economic efficiency and lower noise than a hybrid drive. A typical application highlighting the advantages of this operating condition is traffic congestion at a steep slope (mountain road).

Third Operating Condition

This operating condition is a parallel operating condition. The dual clutch 31 is in an engaged state, the synchronizer 6 is in an engaged state, and the engine unit 1 and the first motor generator 41 transfer the power to the driving gear of the main reducer via the shift gear set (including the driving gear 25 and the driven gear 26 meshed correspondingly with the driving gear 25) and the synchronizer 6, and the second motor generator 42 drives the wheels 200 via the driving gear of the main reducer. This operating condition is mainly applicable to a situation where a load is the largest, for example, during quick acceleration, or climbing steep slopes.

This operating condition has the advantages that three engine units are applied, for example, first and second motor generators 41, 42 and the engine unit 1, to drive the vehicle simultaneously, thus maximizing the dynamic performance.

Fourth Operating Condition

This operating condition is a series operating condition. The dual clutch 31 is in an engaged state, the synchronizer 6 is in a disengaged state, the engine unit 1 drives the first motor generator 41 via the dual clutch 31 and the shift gear set (including the driving gear 25 and the immediate gear 411 meshed correspondingly with the driving gear 25) to generate electricity, and the second motor generator 42 is configured to drive the wheels 200 via the driving gear of the main reducer. This operating condition is mainly applicable to a situation where a load is medium and an electric quantity of a battery is small.

This operating condition has the advantages that since the second motor generator 42 directly drive the wheels 200, the transmission chain is the shortest, and operating components is the fewest, thus achieving maximum transmission efficiency and minimum noise.

Moreover, the first motor generator 41 may keep the engine unit 1 running in an optimal economic region through the torque and speed control, thus reducing fuel consumption during the electricity generation.

Fifth Operating Condition

This operating condition is a braking/decelerating feedback operating condition. The dual clutch 31 is in a disengaged state, the synchronizer 6 is in an engaged state, and the engine unit 1 does not operate. The first motor generator 41 brakes the driving gear of the main reducer via the shift gear set and the synchronizer 6, and generates electricity. The second motor generator 42 brakes the wheels 200 through the driving gear 51 of the main reducer, and generates electricity. This operating condition is mainly used for braking or decelerating the vehicle.

This operating condition has the advantages that, since the first motor generator 41 and the second motor generator 42 brake the wheels together during the decelerating or braking, the braking power may be fully absorbed and converted to electric energy, thus maximizing the energy feedback. Moreover, by the disengagement of the dual clutch 31, the braking of the vehicle by the friction torque of the engine unit may be eliminated, so that more power is left to be absorbed by the motor.

Sixth Operating Condition

This operating condition is a series-parallel operating condition. The dual clutch 31 is in an engaged state, the synchronizer 6 is in an engaged state, a part of the power from the engine unit 1 drives the first motor generator 41 via the dual clutch 31 and the shift gear set to generate electricity, the other part of the power from the engine unit 1 is transferred to the driving gear 51 of the main reducer via the shift gear set and the synchronizer 6, and the second motor generators 42 drive the wheels 200 directly via the driving gear 51 of the main reducer. This operating condition is mainly applicable to a situation where a load is large and an electric quantity of a battery is small, for example, during acceleration or climbing. This operating condition has the advantages of exploiting all the power from the engine unit 1, ensuring the dynamic property of the vehicle while generating electricity, and maintaining the electric quantity of the battery.

The above six operating conditions may be switched, and typical switching between operating conditions is switching from the fourth operating condition to the third operating condition, or switching from the fourth operating condition to the fifth operating condition.

Specifically, the switching from the fourth operating condition to the third operating condition will be described as follows. For example, when it is necessary to quickly accelerate for overtaking or avoiding obstacles, according to the throttle demand of a driver, the power transmission system 100 may switch from the fourth operating condition to the third operating condition. At this time, the first motor generator 41 may adjust the rotating speed of the output shaft 24 with the rotating speed of the driving gear of the main reducer as a target speed through the rotating speed control, so as to match the rotating speed of the output shaft 24 with the rotating speed of the driving gear of the main reducer as close as possible, thus facilitating the engagement of the synchronizer 6.

During the matching, the second motor generator 42 may respond to the needs of the driver to increase the torque, such that the vehicle is accelerated. The vehicle needs not to be accelerated only when the synchronizer 6 is in an engaged state. The torque compensation in advance may greatly shorten the torque response time and improve the instantaneous acceleration performance of the vehicle.

As another example, the switching from the fourth operating condition to the fifth operating condition will be described as follows. When the vehicle needs to be braked or decelerated, according to the throttle demand or the brake pedal operation of the driver, the power transmission system 100 may switch from the fourth operating condition to the fifth operating condition. The first motor generator 41 may adjust the rotating speed of the output shaft 24 with the rotating speed of the driving gear of the main reducer as a target speed through the rotating speed control, so as to match the rotating speed of the output shaft 24 with the rotating speed of the driving gear of the main reducer as close as possible, thus facilitating the engagement of the synchronizer 6. During the matching, the second motor generator 42 may respond to the needs of the driver to brake the wheels and to feed back the electric quantity, which need not be like a vehicle in the related art that feeds back the electric quantity only when the synchronizer 6 is in an engaged state. The torque compensation in advance may greatly shorten the motor braking response time and increase the feedback electric quantity.

Specifically, under complex road conditions, for example, when the vehicle runs uphill, downhill, on a bumpy road, or under a low adhesion condition, the engagement of the synchronizer 6 is difficult due to the instability of the speed of the vehicle. Even if the first motor generator 41 may adjust the rotating speed of the output shaft 24 through the rotating speed control, since the rotating speed of the driving gear of the main reducer along with the speed of the vehicle is not controllable, the speed adjusting accuracy and rate of the first motor generator 41 may be reduced. Under such road conditions, since the second motor generator 42 may compensate for the torque of the vehicle, the speed of the vehicle may be stabilized effectively, thus improving the driving experience of the vehicle and simplifying the engagement of the synchronizer 6.

Example 2

Figure 3:
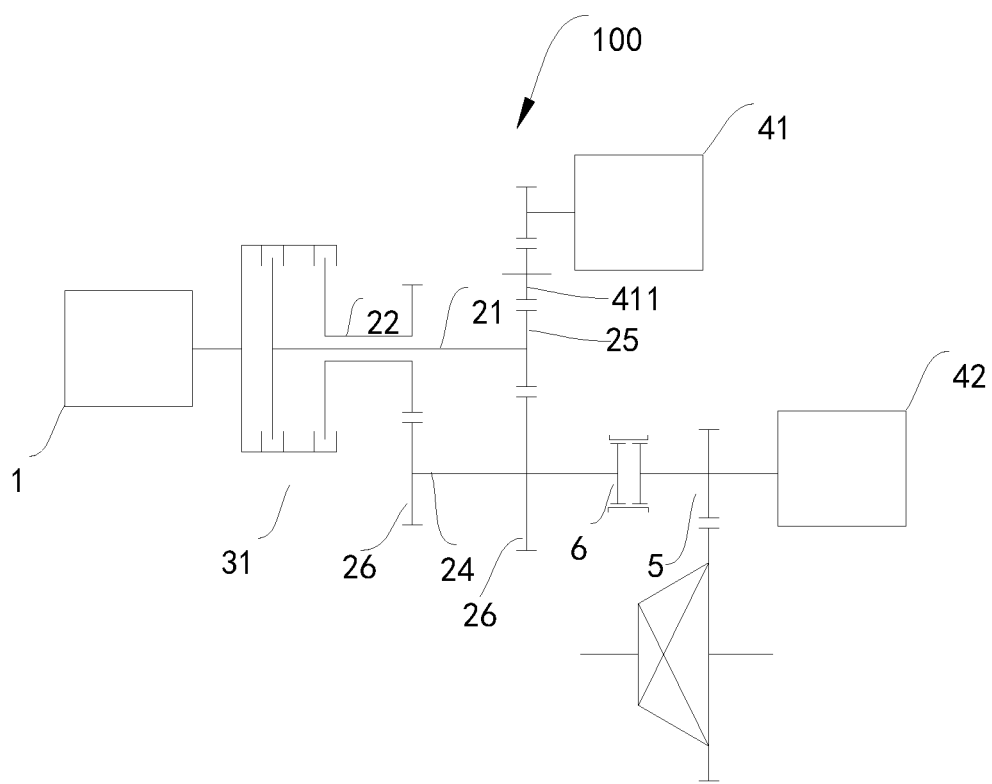
FIG. 3 is a schematic view of a power transmission system according to another embodiment of the present disclosure.

As shown in FIG. 3, the power transmission system 100 in this example differs from the power transmission system 100 shown in FIG. 2 in the arrangement of the first motor generator 41. In the example in FIG. 2, indirect power transmitting between the first motor generator 41 and the driving gear 25 on the first input shaft 21 is performed via one intermediate gear 411.

Other parts in this example are substantially the same as those in the power transmission system 100 shown in FIG. 2, so the detailed description thereof will be omitted here.

Example 3

As shown in FIG. 4, the power transmission system 100 in this example differs from the power transmission system 100 shown in FIG. 2 in the arrangement of the first motor generator 41. In this example, the first motor generator 41 is directly connected with the first input shaft 21. When the first motor generator 41 is configured to generate electricity, the mechanical energy of the engine unit 1 can be output to the first motor generator 41 to generate electricity through the dual clutch 31 and the first input shaft 21. When the first motor generator 41 is configured to output power, the power can be output to the first input shaft 21 directly, and then the power can be transmitted to the output shaft 24 via the first input shaft 21 and the shift gear set. Other parts in this example are substantially the same as those in the power transmission system 100 shown in FIG. 2, so the detailed description thereof will be omitted here.

Example 4

Figure 5:
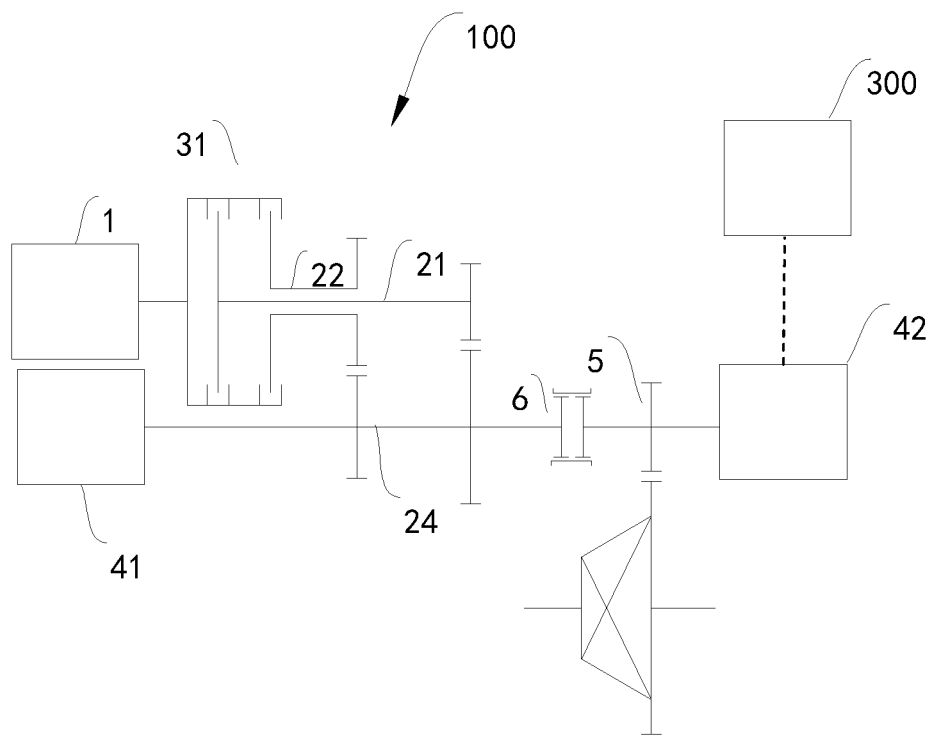
FIG. 5 is a schematic view of a power transmission system according to yet another embodiment of the present disclosure.

As shown in FIG. 5, the power transmission system 100 in this example differs from the power transmission system 100 shown in FIG. 2 in the arrangement of the first motor generator 41. In this example, the first motor generator 41 is directly connected with the output shaft 24. When the first motor generator 41 is configured to generate electricity, the mechanical energy of the engine unit 1 can be output to the first motor generator 41 to generate electricity through the dual clutch 31, the shift gear set and the output shaft 24. When the first motor generator 41 is configured to output power, the power can be output to the output shaft 24 directly. Other parts in this example are substantially the same as those in the power transmission system 100 shown in FIG. 2, so the detailed description thereof will be omitted here.

Example 5

As shown in FIG. 6, the power transmission system 100 in this example differs from the power transmission system 100 shown in FIG. 2 in the type of the clutch as well as the number of the input shafts, the driving gears 25 and the driven gears 26. In this example, the clutch is a triple clutch 32, three input shafts are provided, and correspondingly three pairs of driving gears 25 and driven gears 26 are provided. Other parts in this example are substantially the same as those in the power transmission system 100 shown in FIG. 2, so the detailed description thereof will be omitted here.

Example 6

As shown in FIG. 7, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, the double-linked gear 26 (i.e. a driven gear) is freely fitted over the output shaft 24, the first gear part 261 of the double-linked gear 26 is meshed with the driving gear 25 on the first input shaft 21, and the second gear part 262 of the double-linked gear 26 is meshed with the driving gear 25 on the second input shaft 22.

A first intermediate shaft gear 431 and a second intermediate shaft gear 432 are fixed on the intermediate shaft 43. The first intermediate shaft gear 431 is meshed with the driving gear 25 on the second input shaft 22. Indirect power transmitting between the output terminal of the first motor generator 41 and the second intermediate shaft gear 432 via an intermediate idler 44 can be performed.

The synchronizer 6 is disposed on the output shaft 24 and configured to engage with the double-linked gear 26. The driving gear 51 of the main reducer is fixed on the output shaft 24. The driving gear 51 of the main reducer is externally meshed with the driven gear 53 of the main reducer, and the driven gear 53 of the main reducer may be fixed on a housing of the differential 54, so as to transfer the power to the differential 54. The differential 54 distributes the power and adaptively transfers the distributed power to half axles at two sides of the vehicle, so as to drive the wheels 200.

Example 7

As shown in FIG. 8, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, the double-linked gear 26 (i.e. a driven gear) is freely fitted over the output shaft 24, the first gear part 261 of the double-linked gear 26 is meshed with the driving gear 25 on the first input shaft 21, and the second gear part 262 of the double-linked gear 26 is meshed with the driving gear 25 on the second input shaft 22.

A first intermediate shaft gear 431 and a second intermediate shaft gear 432 are fixed on the intermediate shaft 43. The first intermediate shaft gear 431 is meshed with the driving gear 25 on the second input shaft 22. The output terminal of the first motor generator 41 is directly meshed with the second intermediate shaft gear 432 for power transmitting.

The synchronizer 6 is disposed on the output shaft 24 and configured to engage with the double-linked gear 26. The driving gear 51 of the main reducer is fixed on the output shaft 24. The driving gear 51 of the main reducer is externally meshed with the driven gear 53 of the main reducer, and the driven gear 53 of the main reducer may be fixed on a housing of the differential 54, so as to transfer the power to the differential 54. The differential 54 distributes the power and adaptively transfers the distributed power to half axles at two sides of the vehicle, so as to drive the wheels.

Example 8

As shown in FIG. 9, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, the double-linked gear 26 (i.e. a driven gear) is freely fitted over the output shaft 24, the first gear part 261 of the double-linked gear 26 is meshed with the driving gear 25 on the first input shaft 21, and the second gear part 262 of the double-linked gear 26 is meshed with the driving gear 25 on the second input shaft 22. The output terminal of the first motor generator 41 is directly meshed with the first gear part 261 for power transmitting.

The synchronizer 6 is disposed on the output shaft 24 and configured to engage with the double-linked gear 26. The driving gear 51 of the main reducer is fixed on the output shaft 24. The driving gear 51 of the main reducer is externally meshed with the driven gear 53 of the main reducer, and the driven gear 53 of the main reducer may be fixed on a housing of the differential 54, so as to transfer the power to the differential 54. The differential 54 distributes the power and adaptively transfers the distributed power to half axles at two sides of the vehicle, so as to drive the wheels.

Example 9

As shown in FIG. 10, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, and indirect power transmitting between the first motor generator 41 and the driving gear 25 on the second input shaft 22 is performed via one intermediate gear 411. The output shaft 24 is provided with two driven gears 26, and the two driven gears 26 are meshed with the driving gears 25 on the first input shaft 21 and the second input shaft 22 correspondingly, so as to form two gear sets.

The synchronizer 6 is disposed on the output shaft 24, the driving gear (i.e. the output gear 51) of the main reducer may rotate differentially relative to the output shaft 24, the engagement gear ring 52 adapted to the synchronizer 6 is fixed at a left side of the driving gear of the main reducer via a connecting rod. The driving gear of the main reducer is externally meshed with the driven gear 53 of the main reducer, and the driven gear 53 of the main reducer may be fixed on the differential 54, so as to transfer the power to the differential 54. The differential 54 drives the two front wheels via half shafts on both sides, i.e. left and right half shafts. One second motor generator 42 is provided and the second motor generator 42 drives the rear wheels 220 via one third speed changing mechanism 73.

The power transmission system 100 in this example may have at least the following operating conditions: pure EV operating condition of the second motor generator 42, pure EV four-wheel drive operating condition, a parallel operating condition, a series operating condition, a hybrid (parallel-series) operating condition, and a braking/decelerating feedback operating condition.

First Operating Condition

This operating condition is a pure EV operating condition of the second motor generator 42. The dual clutch 31 is in a disengaged state, and the synchronizer 6 is in a disengaged state. The second motor generator 42 drives the rear wheels 220 via a speed changing mechanism 73. This operating condition is mainly applicable to a situation where a load is small and an electric quantity of a battery is large, for example, during uniform motions or under urban operating conditions. This operating condition has the advantages that, since the second motor generator 42 drives the rear wheels 220 via the speed changing mechanism 73, compared to a front-wheel drive vehicle, the vehicle in this example has better acceleration performance, gradeability and steering capability. Moreover, since the front-wheel drive part is interrupted by the synchronizer 6, there is no mechanical loss in the front-wheel drive part, thus reducing the energy consumption of the vehicle. In a rear-wheel drive part, a differential 54 integrally formed with the speed changing mechanism 73 may also be provided.

Second Operating Condition

In this example, the power transmission system 100 may also have a pure EV four-wheel drive operating condition. At this time, the dual clutch 31 is in a disengaged state, the synchronizer 6 is in an engaged state, the engine unit 1 does not operate, the first motor generator 41 drives the front wheels, and the second motor generator 42 drives the rear wheels. This operating condition is mainly applicable to a situation where a load is large and an electric quantity of a battery is large, for example, during acceleration, climbing, overtaking, or high-speed running. This operating condition has the advantages of having better dynamic performance compared with a single-motor drive condition, and has better economic efficiency and lower noise compared with a hybrid drive condition. A typical application highlighting the advantages of this operating condition is traffic congestion at a steep slope (mountain road). Moreover, compared to a front-wheel drive vehicle and a rear-wheel drive vehicle, a pure EV four-wheel drive vehicle has better acceleration performance, gradeability, handling performance and off-road capability.

Third Operating Condition

In this example, the power transmission system 100 may also have a parallel operating condition. The dual clutch 31 is in an engaged state, the synchronizer 6 is in an engaged state, the engine unit 1 and the first motor generator 41 drive the front wheels simultaneously, and the second motor generator 42 drives the rear wheels. This operating condition is mainly applicable to a situation where a load is the largest, for example, during quick acceleration, or climbing steep slopes. This operating condition has the advantages that two motor generators and the engine unit 1 drive the vehicle simultaneously, thus maximizing the dynamic performance. Compared to a front-wheel drive vehicle and a rear-wheel drive vehicle, a HEV (Hybrid Electric Vehicle) four-wheel drive vehicle has better acceleration performance, gradeability, handling performance and off-road capability.

Fourth Operating Condition

In this example, the power transmission system 100 may also have a series operating condition. The dual clutch 31 is in an engaged state, the synchronizer 6 is in a disengaged state, the engine unit 1 drives the first motor generator 41 to generate electricity, and the second motor generator 42 drive the rear wheels 220. This operating condition is mainly applicable to a situation where a load is medium and an electric quantity of a battery is small. This operating condition has the advantages that compared to a front-wheel drive vehicle, the vehicle under the series operating condition has better acceleration performance, gradeability, handling performance and steering capability. Moreover, the first motor generator 41 may keep the engine unit 1 running in an optimal economic region through the torque and speed control, thus reducing fuel consumption during the electricity generation.

Fifth Operating Condition

In this example, the power transmission system 100 may also have a braking/decelerating feedback operating condition. The dual clutch 31 is in a disengaged state, the synchronizer 6 is in an engaged state, the engine unit 1 does not operate, and the first motor generator 41 and the second motor generator 42 brake the vehicle and generate electricity simultaneously. This operating condition has the advantages that, since two motors brake the vehicle simultaneously during the decelerating or braking of the vehicle, the braking energy may be absorbed to the largest extent and converted into electric energy. By the disengagement of the dual clutch, the braking of the vehicle by the friction torque of the engine unit may be eliminated, so that more power is left to be absorbed by the motor. Because of the braking feedback of the front-wheel drive and the rear-wheel drive, the braking force may be distributed to front and rear motors in the premise of ensuring the braking force of the vehicle, and more electric energy may be fed back compared to a front-wheel drive vehicle or a rear-wheel drive vehicle.

Sixth Operating Condition

This operating condition is a series-parallel operating condition. The dual clutch 31 is in an engaged state, and the synchronizer 6 is in an engaged state. A part of the power from the engine unit 1 drives the first motor generator 41 via the dual clutch 31 and the shift gear set to generate electricity. The other part of the power from the engine unit 1 is transferred to the driving gear 51 of the main reducer via the shift gear set and the synchronizer 6. The second motor generators 42 drive the rear wheels directly. This operating condition is mainly applicable to a situation where a load is large and an electric quantity of a battery is small, for example, during acceleration or climbing. This operating condition has the advantages of exploiting all the power from the engine unit 1, ensuring the dynamic property of the vehicle while generating electricity, and maintaining the electric quantity of the battery.

The above six operating conditions may be switched, and typical switching between operating conditions is switching from the fourth operating condition to the third operating condition, or switching from the fourth operating condition to the fifth operating condition.

Specifically, the switching from the fourth operating condition to the third operating condition will be described as follows. For example, when it is necessary to quickly accelerate for overtaking or avoiding obstacles, according to the throttle demand of a driver, the power transmission system 100 may switch from the fourth operating condition to the third operating condition. At this time, the first motor generator 41 may adjust the rotating speed of the output shaft 24 with the rotating speed of the driving gear of the main reducer as a target speed through the rotating speed control, so as to match the rotating speed of the output shaft 24 with the rotating speed of the driving gear of the main reducer as close as possible, thus facilitating the engagement of the synchronizer 6.

During the matching, the second motor generator 42 may respond to the needs of the driver to increase the torque, such that the vehicle is accelerated. The vehicle needs not to be accelerated only when the synchronizer 6 is in an engaged state. The torque compensation in advance may greatly shorten the torque response time and improve the instantaneous acceleration performance of the vehicle.

As another example, the switching from the fourth operating condition to the fifth operating condition will be described as follows. When the vehicle needs to be braked or decelerated, according to the throttle demand or the brake pedal operation of the driver, the power transmission system 100 may switch from the fourth operating condition to the fifth operating condition. The first motor generator 41 may adjust the rotating speed of the output shaft 24 with the rotating speed of the driving gear of the main reducer as a target speed through the rotating speed control, so as to match the rotating speed of the output shaft 24 with the rotating speed of the driving gear of the main reducer as close as possible, thus facilitating the engagement of the synchronizer 6. During the matching, the second motor generator 42 may respond to the needs of the driver to brake the wheels and to feed back the electric quantity, which need not be like a vehicle in the related art that feeds back the electric quantity only when the synchronizer 6 is in an engaged state. The torque compensation in advance may greatly shorten the motor braking response time and increase the feedback electric quantity.

Specifically, under complex road conditions, for example, when the vehicle runs uphill, downhill, on a bumpy road, or under a low adhesion condition, the engagement of the synchronizer 6 is difficult due to the instability of the speed of the vehicle. Even if the first motor generator 41 may adjust the rotating speed of the output shaft 24 through the rotating speed control, since the rotating speed of the driving gear of the main reducer along with the speed of the vehicle is not controllable, the speed adjusting accuracy and rate of the first motor generator 41 may be reduced. Under such road conditions, since the second motor generator 42 may compensate for the torque of the vehicle, the speed of the vehicle may be stabilized effectively, thus improving the driving experience of the vehicle and simplifying the engagement of the synchronizer 6.

Embodiments of the present disclosure further provide a vehicle including the abovementioned power transmission system 100. It would be appreciated that, other components (e.g., a driving system, a steering system, and a braking system) of the vehicle according to embodiments of the present disclosure are well known to those skilled in the art, so the detailed description thereof will be omitted here.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A power transmission system for a vehicle, comprising:
an engine unit configured to generate power;
a transmission unit;
a first motor generator coupled with the transmission unit;
an output unit configured to transmit the power output by the transmission unit to at least one of front and rear wheels of the vehicle; and
a synchronizer interposed between the transmission unit and the output unit,
wherein the transmission unit comprises:
a transmission power input part comprising a plurality of input shafts coaxially fitted over one another sequentially and a plurality of driving gears disposed on the plurality of input shafts, wherein the engine unit is configured to selectively engage with one of the plurality of input shafts to transmit the power to the one of the plurality of input shafts; and
a transmission power output part comprising an output shaft and a plurality of driven gears disposed on the output shaft and configured to mesh with the plurality of driving gears on the plurality of input shafts, wherein the transmission power output part is configured to output the power from the transmission power input part to the output unit via the synchronizer interposed between the output unit and the output shaft of the transmission unit, wherein the synchronizer is connected to and in contact with the output shaft of the transmission unit,
wherein the synchronizer is configured to synchronize a rotating speed of the output unit with a rotating speed of the output shaft of the transmission unit; and
wherein the first motor generator is configured to adjust the rotating speed of the output shaft of the transmission unit according to the rotating speed of the output unit.

2. The power transmission system according to claim 1, wherein each of the plurality of input shafts corresponds to one of the plurality of the driving gears, and the plurality of driven gears are configured to mesh with the plurality of the driving gears respectively.

3. The power transmission system according to claim 2, wherein the plurality of the input shafts comprises a first input shaft and a second input shaft fitted over the first input shaft, and wherein the power transmission system further comprises a dual clutch including
an input terminal coupled with the engine unit,
a first output terminal coupled with the first input shaft, and
a second output terminal coupled with the second input shaft.

4. The power transmission system according to claim 3, wherein the first motor generator is configured to be coupled with one of the first input shaft and the output shaft.

5. The power transmission system according to claim 2, wherein the plurality of the input shafts comprise a first input shaft, a second input shaft fitted over the first input shaft, and a third input shaft fitted over the second input shaft; and wherein the power transmission system further comprises a triple clutch including an input terminal coupled with the engine unit, a first output terminal coupled with the first input shaft, a second output terminal coupled with the second input shaft, and a third output terminal coupled with the third input shaft.

6. The power transmission system according to claim 1, wherein the output unit comprises an output gear adapted to rotate differentially relative to the output shaft, and an engagement gear ring fixed to the output gear.

7. The power transmission system according to claim 1, wherein the plurality of driven gears include a linked gear fitted over the output shaft, and the synchronizer is disposed on the output shaft and configured to selectively engage with the linked gear.

8. The power transmission system according to claim 7, wherein the plurality of input shafts comprise first input shaft and a second input shaft fitted over the first input shaft, two driving gears are fixed on the first input shaft and the second input shaft respectively, the linked gear includes a double-linked gear having a first gear part and a second gear part, and the first gear part and the second gear part are configured to mesh with the two driving gears respectively.

9. The power transmission system according to claim 1, further comprising a second motor generator having an output terminal configured to cooperate with the output unit for power transmitting.

10. The power transmission system according to claim 9, wherein when the synchronizer switches from a disengaged state to an engaged state with the output unit, the second motor generator is configured to adjust the rotating speed of the output unit.

11. The power transmission system according to claim 9, wherein
when the synchronizer switches from a disengaged state to an engaged state with the output unit,
the first motor generator is configured to adjust the rotating speed of the output shaft; and
the second motor generator is configured to adjust the rotating speed of the output unit.

12. The power transmission system according to claim 1, wherein when the synchronizer is configured to switch from a disengaged state to an engaged state with the output unit, the first motor generator is configured to adjust the rotating speed of the output shaft.

13. The power transmission system according to claim 1, wherein the output unit is configured to drive a first pair of wheels of the vehicle, and the power transmission system further comprises a second motor generator configured to drive a second pair of wheels of the vehicle.

14. The power transmission system according to claim 13, wherein the second motor generator is configured to drive the second pair of wheels via a speed changing mechanism.

15. A vehicle comprising the power transmission system according to claim 1.

* * * * *